(12) United States Patent
Emer et al.

(10) Patent No.: US 6,449,713 B1
(45) Date of Patent: *Sep. 10, 2002

(54) IMPLEMENTATION OF A CONDITIONAL MOVE INSTRUCTION IN AN OUT-OF-ORDER PROCESSOR

(75) Inventors: Joel Springer Emer, Acton; Bruce Edwards, Belmont; Daniel Lawrence Leibholz, Cambridge; Edward J. McLellan, Holliston, all of MA (US); Derrick R. Meyer, Austin, TX (US)

(73) Assignee: Compaq Information Technologies Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,121

(22) Filed: Nov. 18, 1998

(51) Int. Cl.$^7$ .................................. G06F 9/00
(52) U.S. Cl. ....................... 712/234; 717/155
(58) Field of Search ................ 712/218, 235, 712/239, 237, 234, 225, 213, 23, 236; 708/653; 717/155

(56) References Cited

U.S. PATENT DOCUMENTS

| | | | |
|---|---|---|---|
| 5,426,600 A | * 6/1995 | Nakagawa et al. | 708/653 |
| 5,564,118 A | 10/1996 | Steely, Jr. et al. | 395/375 |
| 5,745,724 A | * 4/1998 | Favor et al. | 712/213 |
| 5,889,984 A | * 3/1999 | Mills | 712/225 |
| 5,974,240 A | * 10/1999 | Chan | 712/218 |
| 6,058,472 A | * 5/2000 | Panwar et al. | 712/218 |
| 6,065,115 A | * 5/2000 | Sharangpani et al. | 712/235 |
| 6,067,616 A | * 5/2000 | Stiles et al. | 712/239 |
| 6,119,220 A | * 9/2000 | Sato | 712/235 |
| 6,167,509 A | * 12/2000 | Sites et al. | 712/237 |
| 6,170,052 B1 | * 1/2001 | Morrison | 712/236 |
| 6,282,630 B1 | * 8/2001 | Nguyen et al. | 712/23 |

OTHER PUBLICATIONS

Yeh, Tse-Yu, and Patt, Yale N., "Two-Level Adaptive Training Branch Prediction," Association for Computing Machinery, 0-89791-460-0/91/0011/0051.

Keller, Jim, "The 21264: A Superscalar Alpha Processor with Out-of-Order Execution," Digital Semiconductor, Digital Equipment Corp., Hudson, MA, no date given.

(List continued on next page.)

Primary Examiner—Zarni Maung
Assistant Examiner—Jung-won Chang
(74) Attorney, Agent, or Firm—Hamilton, Brook, Smith & Reynolds, P.C.

(57) ABSTRACT

A technique for handling a conditional move instruction in an out-of-order data processor. The technique involves detecting a conditional move instruction within an instruction stream, and generating multiple instructions according to the detected conditional move instruction. The technique further involves replacing the conditional move instruction within the instruction stream with the generated multiple instructions. The generated multiple instructions are generated such that each of the generated multiple instructions executes using no more than two input ports of an execution unit. The generated multiple instructions include a first generated instruction that produces a condition result indicating whether a condition exists, and a second generated instruction that inputs the condition result as a portion of an operand which identifies a register of the out-of-order data processor. The second generated instruction performs a first move operation when the condition is determined to exist, and a second move operation when the condition is determined not to exist.

23 Claims, 6 Drawing Sheets

OTHER PUBLICATIONS

Gieseke, Bruce A., et al., "A 600 MHz Superscalar RISC Microprocessor With Out–of–Order Execution," Digital Semiconductor, Digital Equipment Corporation, Hudson, MA, no date given.

Gwennap, Linley, "Digital 21264 Sets New Standard," *Microprocessor Report*, 10(14), Oct. 28, 1996.

Gieseke, Bruce A., et al., "FA 10.7: A 600 MHZ Superscalar RISC Microprocessor with Out–of–Order Execution." Paper presented at the *1997 IEEE International Solid–State Circuits Conference*, 0–7803–3721–2/97.

Emer, Joel, and Gloy, Nikolas, "A Language for Describing Predictors and Its Application to Automatic Synthesis," *Proceedings of the 24th Annual International Symposium on Computer Architecture*, Denver, CO, Jun. 2–4, 1997.

Johnson, Mike, "The Role of Exception Recovery." In *Superscalar Microprocessor Design* (New Jersey:PTR Prentice Hall), pp. 87–102 (1991).

* cited by examiner

IMPLEMENTATION OF A CONDITIONAL MOVE INSTRUCTION IN AN OUT-OF-ORDER PROCESSOR

FIELD OF THE INVENTION

The present invention relates generally to data processing and in particular to techniques for processing a conditional move instruction within a data processor.

BACKGROUND OF THE INVENTION

In general, data processors are capable of executing a variety of instructions. one type of instruction is called a conditional move instruction. From a programmer's perspective, a typical conditional move instruction instructs a processor to test whether a particular condition exists (e.g., whether a particular register stores zero), and to move information into a destination register if the particular condition exists. If the $$CMOVXX\ S\_R_A, S\_R_E, D\_R_C,$$

where "CMOVXX" indicates that the instruction is a conditional move instruction that tests for a condition "XX". "$S\_R_A$" and "$S\_R_B$" are source operands that respectively identify registers $R_A$ and $R_B$. "$D\_R_C$" is a destination operand that identifies register $R_C$.

In general, how a processor uses registers depends on whether the processor is capable of executing instructions out of program order. For a processor that cannot execute instructions out of program order (i.e., an in-order processor), instruction source and destination operands typically identify physical registers within the processor. The pseudo-code for executing the CMOVXX instruction in an in-order processor is as follows:

if $(XX(R_A))$, then $R_C=R_B$.

According to the pseudo-code, the processor determines whether a condition XX exists involving physical register $R_A$ (e.g., whether physical register $R_A$ stores zero). If the condition XX exists, the processor moves the contents of physical register $R_B$ into physical register $R_C$. Otherwise, the processor leaves the original contents of physical register $R_C$ unaltered.

In a processor that is capable of executing instructions out of program order (i.e., an out-of-order processor), instruction source and destination operands typically identify logical registers instead of the physical registers directly. The out-of-order processor maps these logical registers to physical processor registers just before instruction execution such that the result of each instruction is stored in a new physical register. This approach enables the processor to avoid problems when executing instructions out of program order (e.g., read-after-write data hazards).

The pseudo-code for executing a CMOVXX instruction in an out-of-order processor is therefore somewhat more complex. Suppose that, prior to mapping the CMOVXX instruction, the out-of-order processor maps logical register $R_A$ to physical register $R_{A1}$, logical register $R_B$ to physical register $R_{B1}$, and logical register $R_C$ to physical register $R_{C1}$. Additionally suppose that, after mapping the CMOVXX instruction, the out-of-order processor maps logical register $R_C$ to physical register $R_{C2}$ (an new physical register). The pseudo-code for executing the CMOVXX instruction in such a processor is therefore as follows:

if $(XX(R_{A1}))$, then $R_{C2}=R_{B2}$ else $R_{C2}=R_{C1}$.

According to the pseudo-code, the out-of-order processor determines whether a condition XX exists involving physical register $R_{A1}$ (logical register $R_A$) If the condition XX exists, the processor moves the contents of physical register $R_{B1}$ (logical register $R_B$) into physical register $R_{C2}$ (to which logical register $R_C$ presently is mapped). As such, the contents of logical register $R_B$ are stored in logical register $R_C$. If the condition XX does not exist, the processor moves the contents of physical register $R_{C1}$ (to which logical register $R_C$ previously was mapped) into physical register $R_{C2}$ such that a programmer perceives the contents of logical register $R_C$ as remaining unaltered.

SUMMARY OF THE INVENTION

When a processor executes an instruction within an instruction stream, an execution circuit (or unit) of the processor receives instruction data through input ports, and executes the instruction according to the instruction data. For example, an execution unit of an in-order processor may execute the conditional move instruction:

$$CMOVXX\ S\_R_A, S\_R_B, D\_R_C$$

according to the pseudo-code:

if $(XX(R_A))$, then $R_C=R_B$ where $R_A$, $R_B$ and $R_C$ refer to physical registers within the in-order processor. To receive instruction data used by the CMOVXX instruction, the execution unit requires only two input ports: a first port to receive the contents of physical register $R_A$, and a second port to receive the contents of physical register $R_B$.

However, an execution unit of an out-of-order processor executes the CMOVXX instruction according to the following pseudo-code:

if $(XX(R_{A1}))$, then $R_{C2}=R_{B1}$ else $R_{C2}=R_{C1}$ where $R_{A1}$, $R_{B1}$, $R_{C1}$ and $R_{C2}$ refer to physical registers within the in-order processor. To implement this instruction, the out of order execution unit requires three input ports: a first port to receive the contents of physical register $R_{A1}$, a second port to receive the contents of physical register $R_{B1}$, and a third port to receive the contents of physical register $R_{C1}$.

There are disadvantages to a processor that uses three input ports to execute instructions. In particular, such a processor would require substantial semiconductor resources (e.g., a disproportionately large area for input port routing). Additionally, processors typically use no more than two input ports to execute non-conditional move instructions. Accordingly, processor designers generally prefer to limit the number of input ports for each instruction to no more than two. Unfortunately, as explained above, a conventional implementation the CMOVXX instruction within an out-of-order processor uses three input ports.

In contrast, an embodiment of the present invention is directed to a technique for handling a conditional move instruction in an out-of-order data processor. The technique involves detecting a conditional move instruction within an instruction stream, and generating multiple instructions according to the detected conditional move instruction. The technique further involves replacing the conditional move instruction within the instruction stream with the generated multiple instructions. Preferably, each of the generated multiple instructions executes using no more than two input ports. As such, it is unnecessary for the processor to use three input ports to execute the instructions.

The generation of multiple instructions preferably involves providing a first generated instruction that determines whether a condition exists, and providing a second generated instruction that performs a move operation based on whether the condition exists. In particular, the second generated instruction performs a first move operation when the condition is determined to exist, and a second move operation when the condition is determined not to exist. When the condition exists, the first move operation loads a new physical register with contents from a specified source register so that, from a programmer's perspective, the processor alters a logical register mapped to the new physical register. When the condition does not exist, the second move operation loads the new physical register with contents of a previously used physical register (to which the logical register was previously mapped) so that, from the programmer's perspective, the processor leaves the logical register unaltered.

Instruction generation may involve providing a first generated instruction that produces a condition result, and providing a second generated instruction that (i) inputs the condition result from a first portion of a register that is separate from a second portion that stores standard contents of the register, and (ii) performs an operation according to the first portion. To this end, the mechanisms for storing the condition result and the standard contents are treated as a single entity (e.g., a register with an extra bit field to store the condition result) rather than as separate registers. As such, the same circuitry for addressing and accessing the standard portion of the registers can be used to address and access the condition field. This feature allows the processor to transfer the condition result through one of two existing input ports alleviating the need for a third input port to carry the condition result. In particular, the processor includes a register file containing instruction registers, each of which has a standard field and a condition field.

Prior to detecting the conditional move instruction, instructions may be loaded from memory in groups (e.g., fetch blocks). In particular, the technique may further involve retrieving a first group of instructions from a memory during a first fetch period, the first group of instructions including the conditional move instruction. Such a retrieval enables instructions to be loaded using less retrieve operations than loading instructions individually.

Other subsequent groups of instructions may be loaded as well. For example, the technique may further include retrieving a second group of instructions from the memory during a second fetch period, the second group following the first group within the instruction stream. The technique may involve retrieving the second group of instructions from the memory again during a third fetch period while the multiple instructions are generated simultaneously. This feature provides an optimization in the sense that, retrieval of the second group of instructions during the third fetch period will make the second group of instructions available at a convenient point in the pipeline to receive one of the generated multiple instructions.

Alternatively, the technique may involve overwriting the conditional move instruction in the retrieved first group of instructions with one of the generated multiple instructions, and overwriting an instruction following the conditional move instruction in the retrieved first group of instructions with another of the generated multiple instructions. In this situation, the instruction following the conditional move instruction is preferably a blank instruction that performs no operation when executed. Accordingly, the processor simply modifies the fetch block containing the conditional move instruction without affecting a subsequent fetch block.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

The present invention involves detecting a conditional move instruction within an instruction stream, and replacing it with multiple replacement instructions such that a data processor processing the instruction stream executes the multiple replacement instructions rather than the original conditional move instruction. Preferably, the data processor uses no more than two input ports when executing each of the multiple instructions so that additional processor resources (e.g. a third input port for each instruction) are unnecessary.

Figure 1:
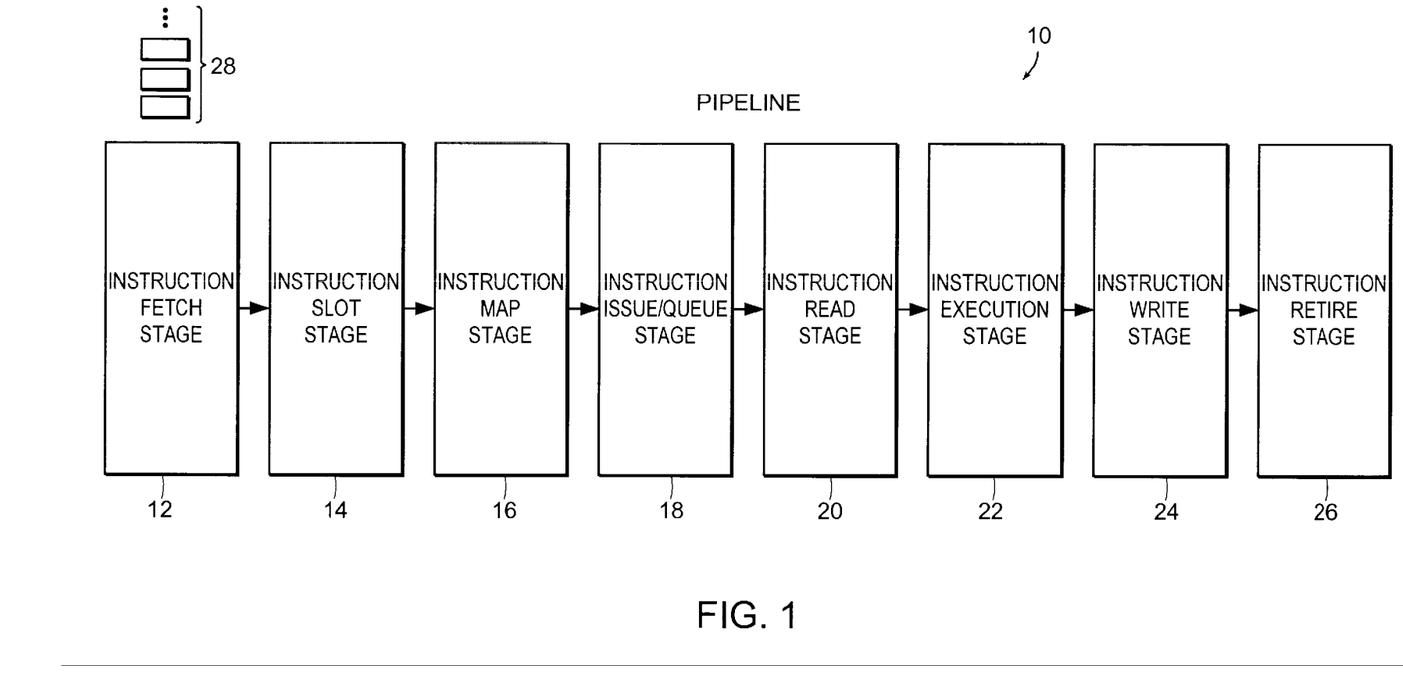
FIG. 1 is a block diagram of an instruction pipeline for a data processor in which the present invention may be used.

The invention is preferably used in an instruction pipeline of a speculative execution out-of-order data processor such as the pipeline 10 shown in FIG. 1. The pipeline 10 has a series of stages including an instruction fetch stage 12, an instruction slot stage 14, an instruction map stage 16, an instruction issue/queue stage 18, an instruction read stage 20, an instruction execution stage 22, an instruction write stage 24, and an instruction retire stage 26.

The pipeline 10 processes a stream of instructions 28. First, the instruction fetch stage 12 retrieves the instructions from memory. Second, the instruction slot stage 14 determines to which execution unit the instructions should be sent, e.g., a floating point unit or an integer unit (not shown). Third, the instruction map stage 16 maps the instructions such that the instructions refer to physical registers rather than logical registers. Fourth, the instruction issue/queue stage 18 queues the instructions for execution. Fifth, the instruction read stage 20 reads data used by the instructions from the physical registers. Next, the instruction execution stage 22 executes the instructions. Then, the instruction write stage 24 stores results of the executed instructions in the physical registers. Finally, the instruction retire stage 26 retires the instructions by committing the processor state to the results of the instructions.

Figure 2:
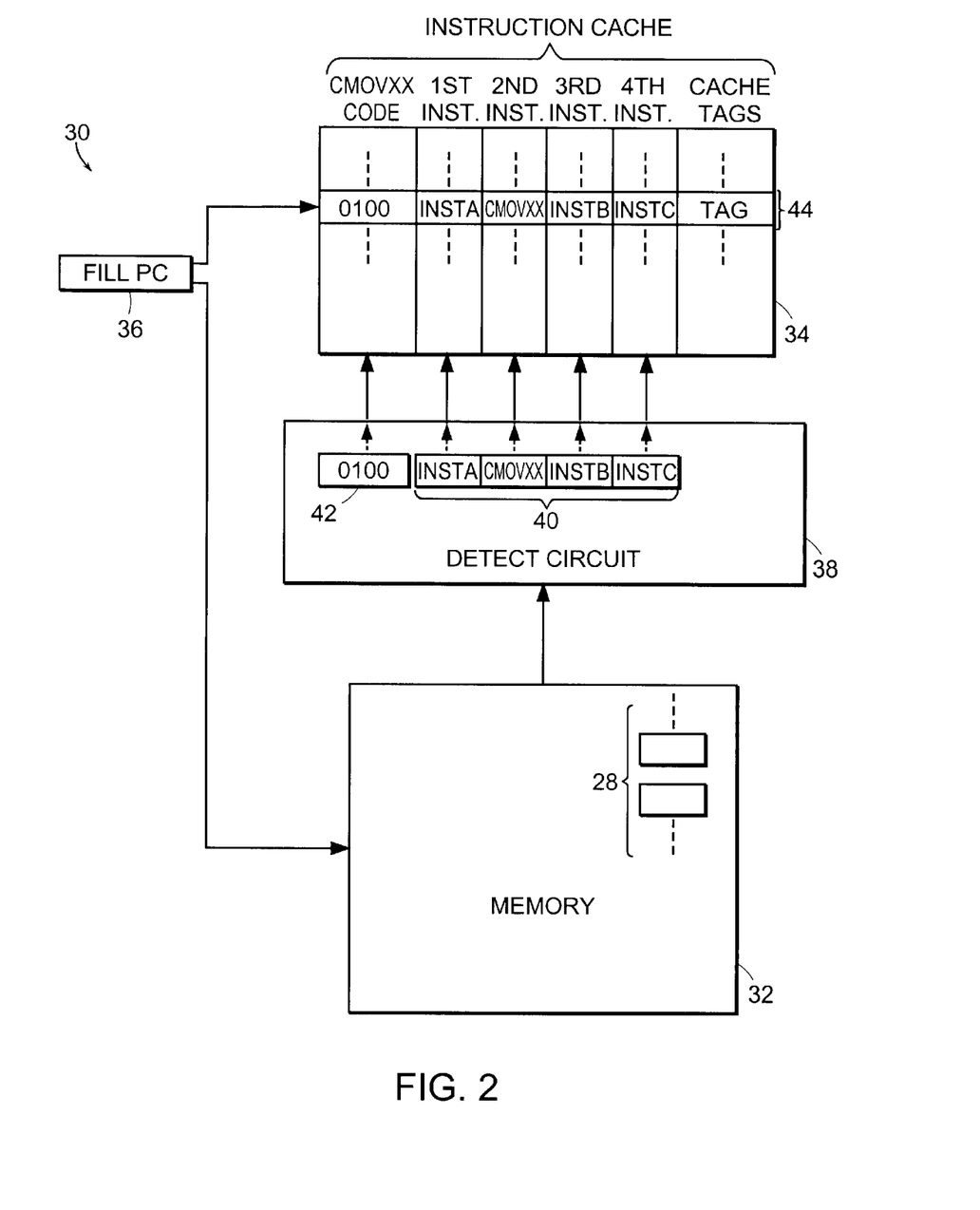
FIG. 2 is a block diagram of a portion of an instruction fetch stage of FIG. 1 that detects a conditional move instruction within an instruction stream.

FIG. 2 shows a circuit portion 30 of the instruction fetch stage 12 that retrieves the instructions 28 from a memory 32 (e.g., main memory or a second-level cache), and temporarily stores the retrieved instructions 28 in an instruction cache (or ICACHE) 34. The circuit portion 30 includes a program counter circuit 36 and a detect circuit 38. The program counter circuit 36 provides program counter information (e.g., a FILL PC pointer) identifying locations within the memory 32 that store instructions to be retrieved. The detect circuit 38 reads instructions from the memory 32 based on the program counter information, scans the retrieved instructions for any conditional move instructions (e.g., CMOVXX), and stores the instructions and scan results in the instruction cache 34. In particular, the detect circuit 38 groups the instructions into fetch blocks (e.g., fetch block 40), generates a conditional move code for each fetch block (e.g., conditional move code 42) indicating the locations of any conditional move instructions within that fetch block, and stores each fetch block and its corresponding conditional move code as an entry of the instruction cache 34 (e.g., entry 44). By way of example, the conditional move code 42 has the binary value "0100" to indicate that the second instruction of fetch block 40 is a conditional move instruction, as shown in FIG. 2.

Each entry within the instruction cache 34 further includes cache tag information (e.g., TAG) indicating whether that entry is valid or invalid. When the tag information indicates that the entry is valid, a read attempt of that entry results in a cache hit. If the tag information indicates that the entry is invalid, a read attempt of that entry results in a cache miss.

Figure 3:
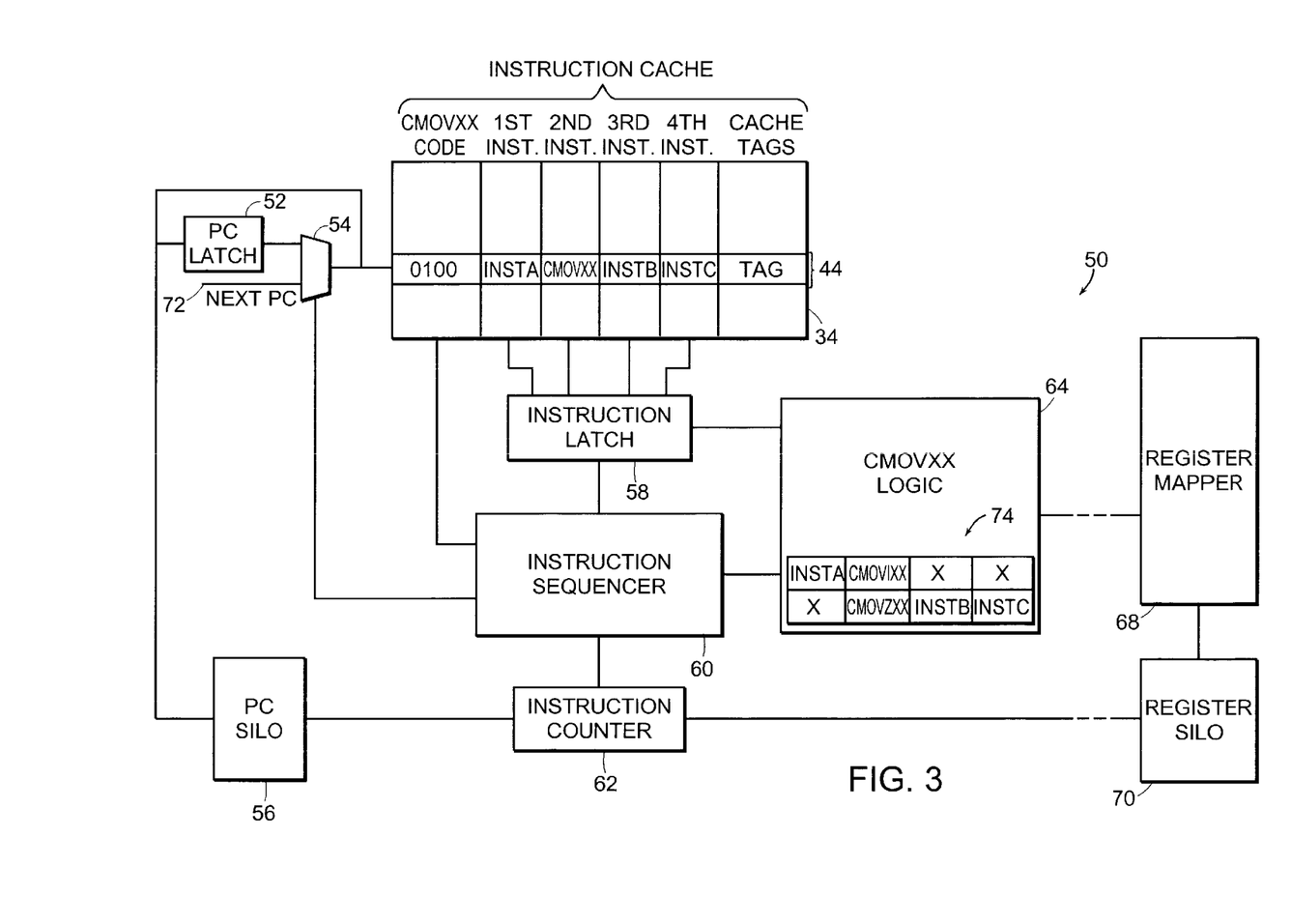
FIG. 3 is a block diagram of a portion of the instruction fetch stage of FIG. 1 that generates multiple instructions according to the detected conditional move instruction, and replaces the conditional move instruction within the instruction stream with the generated multiple instructions.

FIG. 3 shows a circuit portion 50 of the instruction fetch stage 12 that provides instructions from the instruction cache 34 to other circuits in the pipeline 10. If a conditional move instruction exists within the instructions, the circuit portion 50 generates multiple instructions according to the conditional move instruction, and replaces the conditional move instruction with the generated multiple instructions.

The circuit portion 50 includes a PC latch 52, a PC multiplexer 54, a PC silo 56, an instruction latch 58, an instruction sequencer 60, an instruction counter 62, and conditional move logic (or CMOVXX logic) 64. The PC latch 52, the PC multiplexer 54 and PC silo 56 (hereinafter generally referred to as PC circuitry) operate to provide program counter information identifying instruction cache entries (e.g., entry 44) to be transferred out of the instruction cache 34. The instruction latch 58 holds the fetch blocks from the identified entries, and provides them to the CMOVXX logic 64. Simultaneously, the instruction sequencer 60 retrieves the corresponding conditional move codes from the identified entries, and controls the operation of the PC circuitry and the CMOVXX logic 64 based on the retrieved conditional move codes. In particular, when a conditional move code indicates that its corresponding fetch block does not include a conditional move instruction, the instruction sequencer 60 signals the CMOVXX logic 64 simply to pass the fetch block from the instruction latch 58 to circuits further down the pipeline 10 (e.g., a register mapper 68). Additionally, the instruction sequencer 60 signals the PC circuitry to continue providing a program counter signal (NEXT PC) received on an input 72 of the PC multiplexer 54 so that another entry of the instruction cache 34 can be identified for transfer.

Figure 4A:
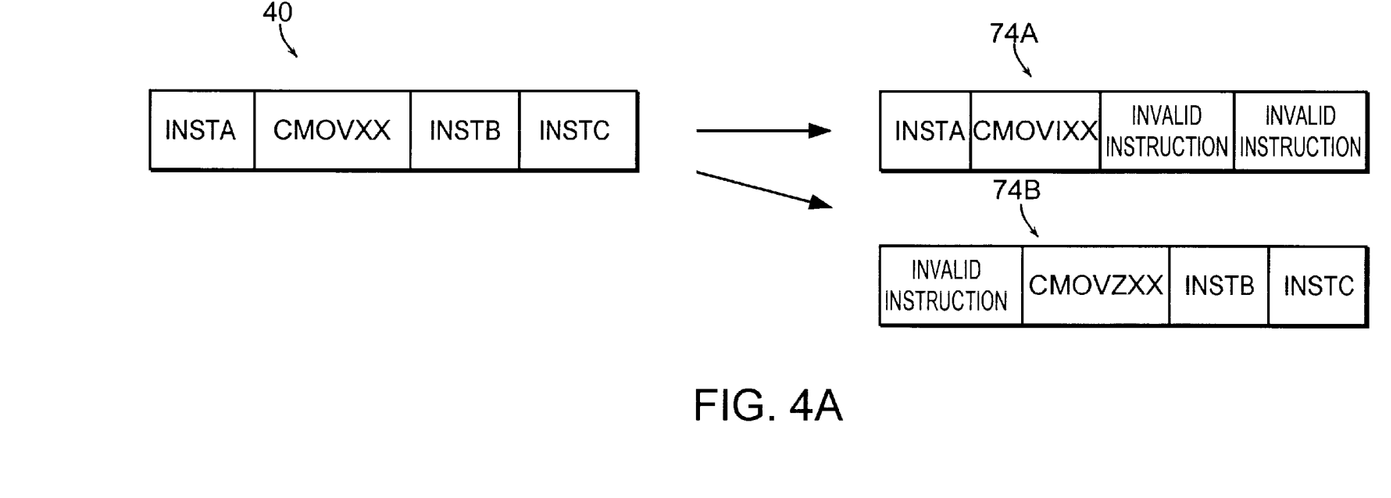
FIG. 4A is a block diagram of instructions before and after being handled in a first manner by the instruction fetch stage of FIG. 1.

However, when a conditional move code indicates that its corresponding fetch block includes a conditional move instruction, the instruction sequencer 60 signals the CMOVXX logic 64 (i) to generate multiple instructions (i.e., CMOV1XX and CMOV2XX), and (ii) to replace the conditional move instruction with the generated multiple instructions. In response, as shown in FIG. 4A, the CMOVXX logic 64 forms two copies of the fetch block (e.g., fetch block 40) containing the conditional move instruction. In the first copy (fetch block 74A), the CMOVXX logic 64 overwrites the conditional move instruction with one of the multiple instructions (CMOV1XX), and invalidates any instructions in the first copy that follow the conditional move instruction. In the second copy (fetch block 74B), the CMOVXX logic 64 overwrites the conditional move instruction with another of the multiple instructions (CMOV2XX), and invalidates any instructions preceding the conditional move instruction in the second copy. As a result, the CMOVXX logic creates two fetch blocks that preserve the fetch block positions of the non-conditional move instructions, and that have the conditional move instruction replaced with the multiple generated instructions (CMOV1XX and CMOV2XX).

With reference again directed to the circuit portion 50 and FIG. 3, when the instruction sequencer 60 signals the CMOVXX logic 64 to convert a fetch block containing a conditional move instruction into two fetch blocks, the instruction sequencer 60 signals other circuits of the event so that they may adjust their operation accordingly. In particular, the instruction sequencer 60 signals the PC circuitry to provide extra time for the CMOVXX logic 64 to convert one fetch block into the two conditional move fetch blocks 74. The PC circuitry responds by repeating previously provided program counter information enabling the instruction latch 58 to read twice a fetch block of the entry following the entry having the conditional move instruction. When the instruction latch 58 reads this fetch block the first time, the CMOVXX logic 64 ignores it since this read coincides with formation of the second copy of the two conditional move fetch blocks 74. However, when the instruction latch 58 reads this fetch block the second time, the CMOVXX logic 64 processes it in a normal fashion.

It should be understood that the pipeline 10 is preferably capable of speculative execution of instructions since the processor is an out-of-order data processor. The pipeline 10 includes silos for storing prior processor states so that the pipeline can return to a previous state when instruction execution occurs down an incorrect instruction branch. In particular, the pipeline 10 includes a PC silo 56 that stores prior ICACHE addresses (e.g, FILL PC), and a register silo 70 that stores prior logical register to physical register mappings (or assignments).

When the instruction sequencer 60 signals the CMOVXX logic 64 to convert fetch block containing a conditional move instruction into two fetch block with replaced instructions, the instruction sequencer 60 signals the silos (e.g., the PC silo 56 and the register silo 70) of the event. In particular, the instruction sequencer 60 signals the instruction counter 62 which, in turn, updates the PC silo 56 and the register silo 70. Accordingly, if the pipeline 10 executes down an incorrect instruction branch and attempts to recover, the pipeline 10 will have accounted for the conversion of the one fetch block containing a conditional move instruction into two fetch blocks.

Figure 4B:
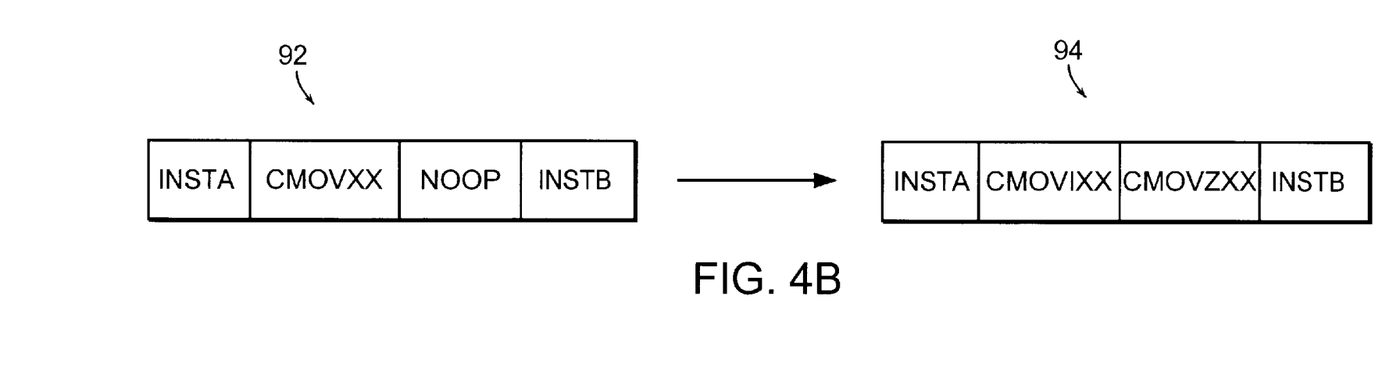
FIG. 4B is a block diagram of instructions before and after being handled in a second manner by the instruction fetch stage of FIG. 1.

As an alternative to creating two fetch blocks, one fetch can be used, as shown in FIG. 4B. In particular, when one or more programs are compiled to form an executable, the compiler can append a blank instruction (e.g., a NO-OP instruction) after the conditional move instruction within the executable. When the processor executes the executable, the CMOVXX logic 64 can simply modify the instruction stream (e.g., fetch block 92) by replacing the CMOVXX instruction with the CMOV1XX instruction, and replacing the subsequent blank instruction with the CMOV2XX instruction (e.g., fetch block 94). In this situation, it is unnecessary to signal other circuits (e.g., the PC circuitry and silos) to account for a change in the number of fetch blocks in the pipeline 10.

Figure 5:
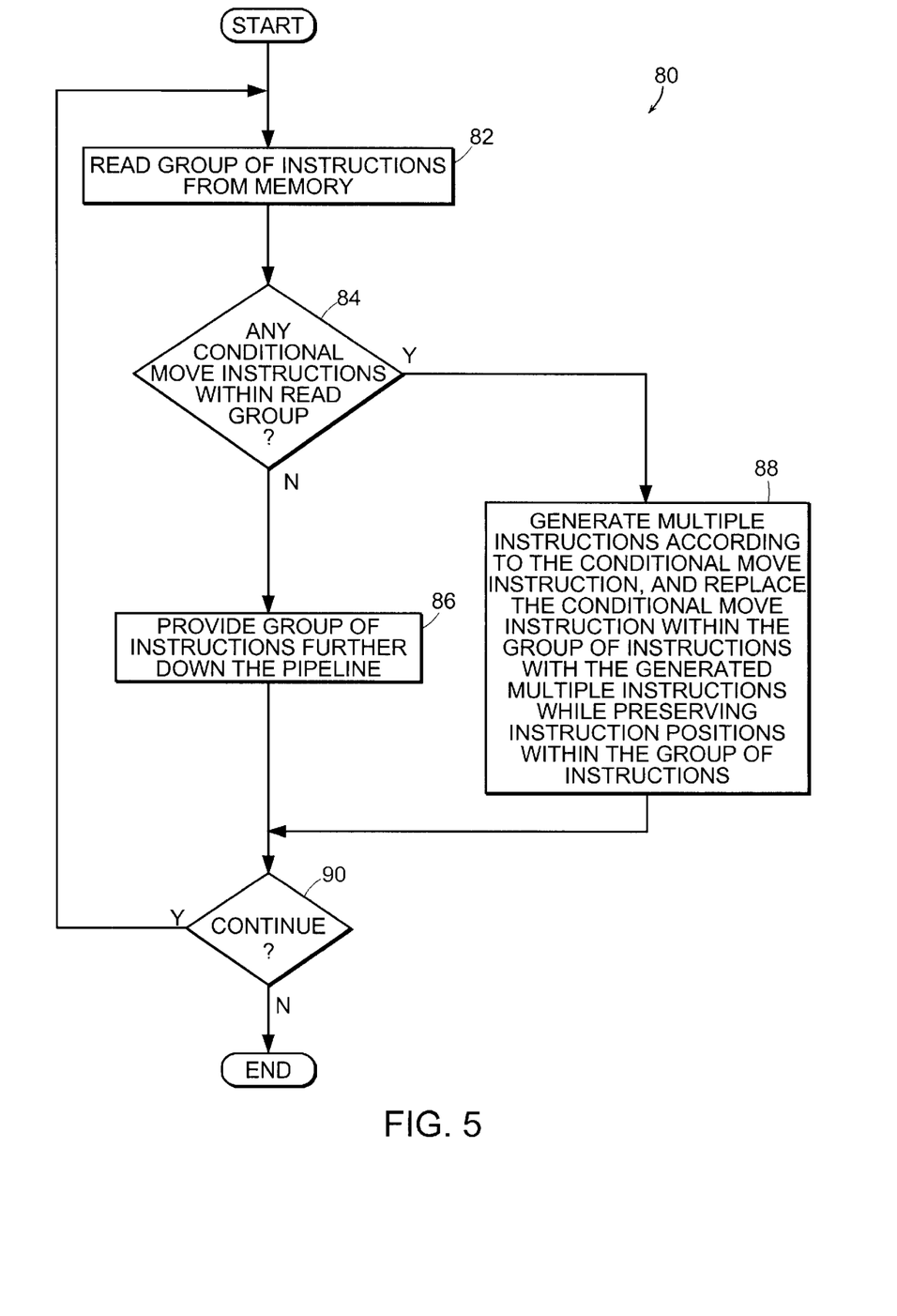
FIG. 5 is a flow diagram of a procedure performed by the instruction fetch stage of FIG. 1.

FIG. 5 shows a flow diagram of a procedure 80 performed by the circuit portions 30,50 of the instruction fetch stage 12. In step 82, the detect circuit 38 reads a group of instructions (e.g., a fetch block) from the memory 32 (see FIG. 2). In step 84, the detect circuit 38 determines whether the group includes any conditional move instructions. If the group does not include any conditional move instructions, step 84 proceeds to step 86, which involves providing the group of instructions to other circuits (e.g., to the register mapper 68) further down the pipeline 10 (see FIG. 3). However, in step 88, if the group includes a conditional move instruction, the CMOVXX logic 64, under control of the instruction sequencer 60 which reads the conditional move code provided by the detect circuit 38, generates multiple instructions according to the conditional move instruction (i.e., the multiple instructions preserve the "XX" operation of the CMOVXX instruction), and replaces the conditional move instruction within the instruction stream with the generated multiple instructions. In particular, the CMOVXX logic 64 performs the replacement in a manner that preserves the instruction positions of the non-conditional move instructions within the fetch blocks. Step 90, which follows steps 86 and 88, loops back to step 82 to handle more instructions within the instruction stream, unless the procedure 80 is terminated (e.g., due to a reset or power down of the processor).

Further details of how the multiple instructions execute within the pipeline 10 will now be provided. The pipeline 10 includes a register file that includes physical processor registers (see physical registers $R_{A1}$, $R_{B1}$, $R_{C1}$, $R_{C2}$ and $R_{C3}$ in FIG. 6). Each of the registers includes a standard field for storing a standard register value (e.g., a 64-bit value), and a predicate (or condition) field (e.g., a single bit). The standard field corresponds to what programmers commonly refer to as the contents of the register. The predicate field is a special field that is preferably used only by the multiple instructions replacing the CMOVXX instruction. That is, the predicate field is preferably not readable directly by the programmers.

The conditional move instruction, which is replaced by the multiple instructions generated by the CMOVXX logic 64, has the following format:

$$CMOVXX\ S\_R_A,\ S\_R_B,\ D\_R_C$$

where $S\_R_A$ and $S\_R_B$ identify logical source registers $R_A$ and $R_B$, respectively, and $D\_R_C$ identifies a logical destination register $R_C$ within the processor. When the CMOVXX logic 64 encounters such an instruction, the CMOVXX logic 64, under control of the instruction sequencer 60, generates two instructions, the first of which has the following format:

$$CMOV1XX\ S\_R_A,\ S\_R_C,\ D\_R_C$$

where CMOV1XX indicates that the instruction is a first instruction generated from the CMOVXX instruction, $S\_R_A$ and $S\_R_C$ identify logical source registers $R_A$ and $R_C$, respectively, and $D\_R_C$ identifies a logical destination register $R_C$ within the processor. "XX" within "CMOV1XX" indicates that the CMOV1XX instruction performs the same type of operation (or function) as that of the CMOVXX instruction (e.g., checking whether the contents of a particular register equal zero). The pseudo-code for the CMOV1XX instruction is as follows:

$$R_{C2}\cdot P = xx(R_{A1});\ R_{C2} = R_{C1}$$

where $R_{A1}$ and $R_{C1}$ are physical registers respectively mapped to logical registers $R_A$ and $R_C$ prior to mapping the CMOV1XX instruction, $R_{C2}$ is a physical register mapped to logical register $R_C$ after mapping the CMOV1XX instruction, and $R_{C2}\cdot P$ is a predicate field of the physical register $R_{C2}$.

The second instruction has the following format:

$$CMOV2XX\ S\_R_B,\ S\_R_C,\ D\_R_C$$

where CMOV2XX indicates that the instruction is a second instruction generated from the CMOVXX instruction, $S\_R_B$ and $S\_R_C$ identify logical source registers $R_B$ and $R_C$, respectively, and $D\_R_C$ identifies a logical destination register $R_C$ within the processor. The pseudo-code for the CMOV2XX instruction is as follows:

$$\text{if } (R_{C2}\cdot P) R_{C3} = R_{C2}\ \text{else}\ R_{C3} = R_{B2}$$

where $R_{B1}$ and $R_{C2}$ are physical registers respectively mapped to logical registers $R_B$ and $R_C$ after mapping the CMOV1XX instruction and prior to mapping the CMOV2XX instruction, $R_{C3}$ is a physical register mapped to logical register $R_C$ after mapping the CMOV2XX instruction, and $R_{C2}\cdot P$ is the predicate field of the physical register $R_{C2}$.

Figure 6:
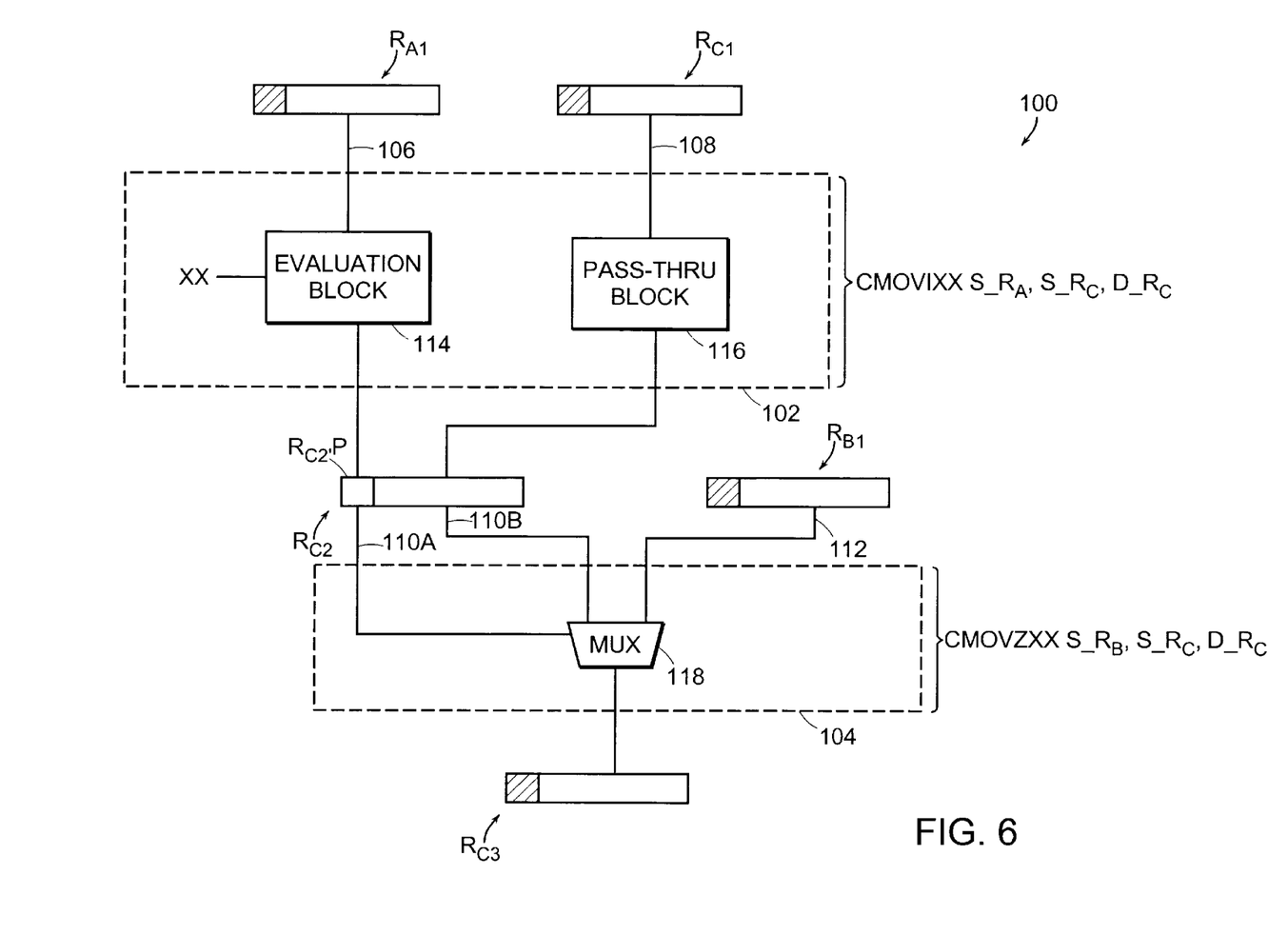
FIG. 6 is a block diagram of execution circuitry within an instruction execution stage of FIG. 1 that executes the generated multiple instructions.

FIG. 6 shows an execution circuit 100 of the instruction execution stage 22 that operates during execution of the CMOV1XX and CMOV2XX instructions. The execution circuit 100 includes a CMOV1XX circuit 102 and a CMOV2XX circuit 104 that connect with physical registers of the register file. The CMOV1XX circuit 102 has a first input port 106 that receives the contents of the standard field of physical register $R_{A1}$, and a second input port 108 that receives the contents of the standard field of physical register $R_{C1}$. The CMOV2XX circuit 104 has a first input port 110 that receives the contents of the standard field of physical register $R_{C2}$, and a second input port 112 that receives the contents of the standard field of physical register $R_{B1}$.

The input port 110 further receives the predicate field of physical register $R_{C2}$. In particular, the predicate field of physical register $R_{C2}$ (i.e., $R_{C2}\cdot P$) passes through a connection 110$_A$, and the standard field of physical register $R_{C2}$ passes through a set of connections 110$_B$.

The CMOV1XX circuit 102 includes an evaluation block 114 and a pass-thru block 116. The evaluation block 114 evaluates the contents of physical register $R_{A1}$ using the function XX (e.g., equal to, greater than, less than, not equal to, etc.). The pass-thru block 116 transfers the standard field of physical register $R_{C1}$ to the standard field of physical register $R_{C2}$.

The CMOV2XX circuit 104 includes a multiplexer 118 that selects between the standard field of physical register $R_{C2}$ (the connection 110$_B$ of input port 110) and the standard field of physical register $R_{B1}$ (input port 112) according to the predicate field of physical register $R_{C2}$ (the connection 110$_A$ of input port 110). The multiplexer 118 outputs the contents of the selected standard field to the standard field of physical register $R_{C3}$. Accordingly, if the predicate field of physical register $R_{C2}$ indicates that condition XX exists at physical register $R_{A1}$, the multiplexer 118 transfers the standard field of physical register $R_{C2}$ to the standard field of physical register $R_{C3}$. on the other hand, if the predicate field of physical register $R_{C2}$ indicates that the condition XX does not exist at physical register $R_{A1}$, the multiplexer 118 transfers the standard field of physical register $R_{B1}$ to the standard field of physical register $R_{C3}$.

As is shown in FIG. 6, each of the CMOV1XX instruction and the CMOV2XX instruction uses no more than two input ports. An extra connection (e.g., a bit line) is used rather than an entire third input port (multiple bit lines). Each register of the register file preferably has such an extra connection to provide access to the predicate field of that register. Such an arrangement provides substantial savings in semiconductor resources relative to providing each instruction with a third input port.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, the circuitry shown in FIG. 6 can be optimized to bypass physical register $R_{C2}$ such that the output of the evaluation block 114 goes directly to the multiplexer 118 through input port 112. Such an optimization removes the steps of storing a value in the predicate field of physical register $R_{C2}$, and subsequently reading the predicate field of physical register $R_{C2}$.

Furthermore, it should be understood that the invalidated instructions of the fetch blocks 74A and 74B in FIG. 4A may be blank instructions (e.g., NO-OP instructions). Alternatively, the invalidated instructions may be the original instructions (e.g., INSTA, INSTB and INSTC) with corresponding flags (not shown) set to indicated to the processor that these instructions are invalid.

What is claimed is:

1. A method for handling a conditional move instruction in an out-of-order data processor, comprising the steps of:
   detecting an original conditional move instruction within an instruction stream;
   generating multiple instructions according to parameters of the detected conditional move instruction, such that each of the multiple instructions executes using no more than two input ports of an execution unit; and
   replacing the conditional move instruction within the instruction stream with the generated multiple instructions.

2. The method of claim 1, wherein the step of generating includes the step of:
   providing a first generated instruction that determines whether a conditions exists; and
   providing a second generated instruction that performs a first move operation when the condition is determined to exist, and a second move operation when the condition is determined not to exist.

3. The method of claim 1, wherein the step of generating includes the step of:
   providing a condition result in a first portion of a register, the first portion of the register being separate from a second portion of the register that stores standard register contents; and
   providing a second generated instruction that (i) inputs the condition result from the first portion of the register, and (ii) performs an operation according to the condition result.

4. The method of claim 1, further comprising the steps of:
   retrieving a first group of instructions from a memory during a first fetch period, the first group of instructions including the conditional move instruction; and
   retrieving a second group of instructions from the memory during a second fetch period, the second group containing the same conditional move instruction, and following the first group within the instruction stream.

5. The method of claim 4, further comprising the step of:
   retrieving the second group of instructions from the memory again during a third fetch period while the multiple instructions are generated simultaneously.

6. The method of claim 1, wherein the step of replacing includes the step of:
   overwriting the conditional move instruction with one of the generated multiple instructions; and
   overwriting an instruction following the conditional move instruction in the instruction stream with another of the generated multiple instructions.

7. The method of claim 6, wherein the instruction following the conditional move instruction in the retrieved first group of instructions is a blank instruction that performs no operation when executed.

8. The method of claim 1, further comprising the step of:
   associating a same program counter value with each of the generated multiple instructions such that the generated multiple instructions are identifiable when speculative execution occurs down an incorrect instruction branch.

9. The method of claim 1, further comprising the step of:
   generating a code that identifies a position of the conditional move instruction within a group of instructions.

10. A method for handling a conditional move instruction in an out-of-order data processor, comprising the steps of:
    detecting an original conditional move instruction within an instruction stream;
    generating multiple instructions according to parameters of the detected conditional move instruction; and
    replacing the conditional move instruction within the instruction stream with the generated multiple instructions, wherein the step of replacing includes the steps of:
    retrieving from the memory, a first group of instructions that includes the conditional move instruction;
    generating a second group of instructions having the conditional move instruction from the first group; and
    revising the first and second groups of instructions such that (i) the conditional move instruction of the first group is replaced with one of the generated multiple instructions and any instructions following the conditional move instruction of the first group are invalidated, and (ii) the conditional move instruction of the second group is replaced with another of the generated multiple instructions and any instructions ahead of the conditional move instruction of the second group are invalidated.

11. A pipeline circuit for handling a conditional move instruction in an out-of-order data processor, comprising:
    a detect circuit that detects an original conditional move instruction within an instruction stream; and
    a control circuit, coupled to the detect circuit, that generates multiple instructions according to parameters of the detected conditional move instruction, and replaces the conditional move instruction within the instruction stream with the generated multiple instructions, the control circuit including an instruction forming circuit that forms the multiple instructions such that each of the multiple instructions executes using no more than two input ports of an execution unit.

12. The pipeline circuit of claim 11, wherein the control circuit includes an output that provides, as the generated multiple instructions:
   a first generated instruction that determines whether a condition exists; and
   a second generated instruction that performs a first move operation when the condition is determined to exist, and a second move operation when the condition is determined not to exist.

13. The pipeline circuit of claim 11, wherein the control circuit includes an output that provides, as the generated multiple instructions:
   a first generated instruction that produces a condition result in a first portion of a register, the first portion of the register being separate from a second portion of the register that stores standard register contents; and
   a second generated instruction that (i) inputs the condition result from the first portion of the register, and (ii) performs an operation according to the condition result.

14. The pipeline circuit of claim 13, further comprising:
   a register file that includes multiple registers, each of the multiple registers having a standard field and a condition field, a particular one of the multiple registers being the register having the first and second portions, the first portion being a condition field and the second portion being a standard field.

15. The pipeline circuit of claim 11, wherein the control circuit includes:
   a sequencing circuit that (i) retrieves a first group of instructions from a memory during a first fetch period, the first group of instructions including the conditional move instruction, and (ii) retrieves a second group of instructions from the memory during a second fetch period, the second group containing the same conditional move instruction, and following the first group within the instruction stream.

16. The pipeline circuit of claim 15, wherein the sequencing circuit is further adapted to retrieve the second group of instructions from the memory again during a third fetch period while the multiple instructions are generated simultaneously.

17. The pipeline circuit of claim 11, wherein the control circuit further includes:
   instruction logic that (i) overwrites the conditional move instruction with one of the generated multiple instructions, and (ii) overwrites an instruction following the conditional move instruction in the instruction stream with another of the generated multiple instructions.

18. The pipeline circuit of claim 17, wherein the instruction following the conditional move instruction in the retrieved first group of instructions is a blank instruction that performs no operation when executed.

19. The pipeline circuit of claim 11, wherein the control circuit includes:
   an instruction sequencer that associates a same program counter value with each of the generated multiple instructions such that the generated multiple instructions are identifiable when speculative execution occurs down an incorrect instruction branch.

20. The pipeline circuit of claim 11, wherein the detect circuit is adapted to generate a code that identifies a position of the conditional move instruction within a group of instructions.

21. A pipeline circuit for handling a conditional move instruction in an out-of-order data processor, comprising:
   a detect circuit that detects an original conditional move instruction within an instruction stream; and
   a control circuit, coupled to the detect circuit, that generates multiple instructions according to parameters of the detected conditional move instruction, and replaces the conditional move instruction within the instruction stream with the generated multiple instructions, wherein the control circuit generates a second group of instructions having the conditional move instruction from a first group of instructions having the conditional move instruction; and
   revises the first and second groups of instructions such that (i) the conditional move instruction of the first group is replaced with one of the generated multiple instructions and any instructions following the conditional move instruction of the first group are invalidated, and (ii) the conditional move instruction of the second group is replaced with another of the generated multiple instructions and any instructions ahead of the conditional move instruction of the second group are invalidated.

22. A method for handling a conditional move instruction in an out-of-order data processor, comprising the steps of:
   detecting an original conditional move instruction within an instruction stream;
   generating multiple instructions according to parameters of the detected conditional move instruction; and
   replacing the conditional move instruction within the instruction stream with the generated multiple instructions, the generated multiple instructions being generated such that each of the generated multiple instructions executes using no more than two input ports of an execution unit, the generated multiple instructions including a first generated instruction that produces a condition result indicating whether a condition exists, and a second generated instruction that inputs the condition result as a portion of an operand which identifies a register of the out-of-order data processor, the second generated instruction performing a first move operation when the condition is determined to exist, and a second move operation when the condition is determined not to exist.

23. A pipeline circuit for handling a conditional move instruction in an out-of-order data processor, comprising:
   a detect circuit that detects an original conditional move instruction within an instruction stream; and
   a control circuit, coupled to the detect circuit, that (i) generates multiple instructions according to parameters of the detected conditional move instruction, and (ii) replaces the conditional move instruction within the instruction stream with the generated multiple instructions, the generated multiple instructions being generated such that each of the generated multiple instructions executes using no more than two input ports of an execution unit, the generated multiple instructions including a first generated instruction that produces a condition result indicating whether a condition exists, and a second generated instruction that inputs the condition result as a portion of an operand which identifies a register of the out-of-order data processor, the second generated instruction performing a first move operation when the condition is determined to exist, and a second move operation when the condition is determined not to exist.

* * * * *